US 9,647,598 B2

(12) United States Patent
Stuetzle

(10) Patent No.: US 9,647,598 B2
(45) Date of Patent: May 9, 2017

(54) METHOD FOR ELECTRICALLY CONNECTING A CONVERTER TO AN ELECTRICAL MACHINE

(71) Applicant: SIEMENS AKTIENGESELLSCHAFT, Munich (DE)

(72) Inventor: Thorsten Stuetzle, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/654,612

(22) PCT Filed: Nov. 25, 2013

(86) PCT No.: PCT/EP2013/074581
§ 371 (c)(1),
(2) Date: Jun. 22, 2015

(87) PCT Pub. No.: WO2014/095236
PCT Pub. Date: Jun. 26, 2014

(65) Prior Publication Data
US 2016/0197572 A1 Jul. 7, 2016

(30) Foreign Application Priority Data
Dec. 20, 2012 (DE) .......................... 10 2012 223 895

(51) Int. Cl.
H02P 1/46 (2006.01)
H02P 27/06 (2006.01)
H02P 1/26 (2006.01)
H02P 1/02 (2006.01)

(52) U.S. Cl.
CPC ................ *H02P 27/06* (2013.01); *H02P 1/26* (2013.01); *H02P 1/46* (2013.01); H02P 1/029 (2013.01)

(58) Field of Classification Search
CPC .................................... H02P 1/46; H02P 27/06
USPC ............................. 318/400.26, 400.01, 700
See application file for complete search history.

(56) References Cited

U.S. PATENT DOCUMENTS

| 6,236,179 | B1* | 5/2001 | Lawler | ................ B60L 11/1807 318/375 |
| 7,193,378 | B1* | 3/2007 | Welchko | ................ H02P 6/085 318/400.27 |
| 7,812,563 | B2 | 10/2010 | Unsworth et al. | |
| 8,559,143 | B2* | 10/2013 | Yasuoka | ............. H02H 7/0805 318/400.22 |
| 2010/0076638 | A1* | 3/2010 | Kitanaka | ................ H02P 27/06 701/22 |

(Continued)

FOREIGN PATENT DOCUMENTS

| CN | 101044672 A | 9/2007 |
| CN | 101884150 A | 11/2010 |

(Continued)

*Primary Examiner* — Kawing Chan
(74) *Attorney, Agent, or Firm* — Laurence Greenberg; Werner Stemer; Ralph Locher

(57) ABSTRACT

A method for electrically connecting a converter to an electrical machine supplied with current by the converter by closing a separate electrical connection between the converter and the machine. The connection includes multiple phases. In order to close the electrical connection without causing undue wear to the material, at least two phases of the connection are closed at different times.

10 Claims, 4 Drawing Sheets

(56) References Cited

U.S. PATENT DOCUMENTS

| | | | | |
|---|---|---|---|---|
| 2010/0253267 A1* | 10/2010 | Kitanaka | ............... | B60L 3/0023 |
| | | | | 318/400.26 |
| 2010/0264865 A1 | 10/2010 | Bakran | | |
| 2010/0289439 A1* | 11/2010 | Kitanaka | ............... | B60L 3/0023 |
| | | | | 318/400.26 |
| 2012/0212168 A1* | 8/2012 | Tsukima | ................ | B60L 3/003 |
| | | | | 318/400.26 |

FOREIGN PATENT DOCUMENTS

| | | |
|---|---|---|
| CN | 202475336 U | 10/2012 |
| DE | 2357653 A1 | 5/1975 |
| DE | 4107362 A1 | 9/1992 |
| DE | 102007060188 A1 | 6/2009 |
| WO | 2006035194 A2 | 4/2006 |

\* cited by examiner

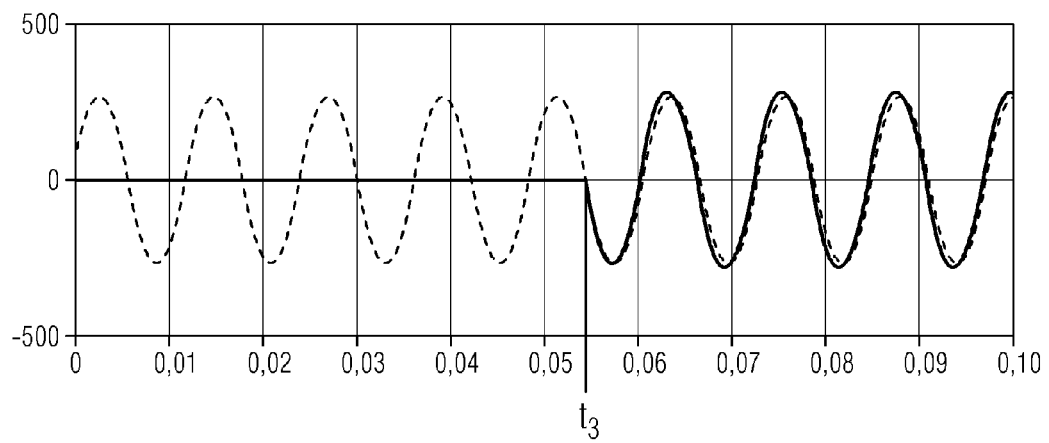
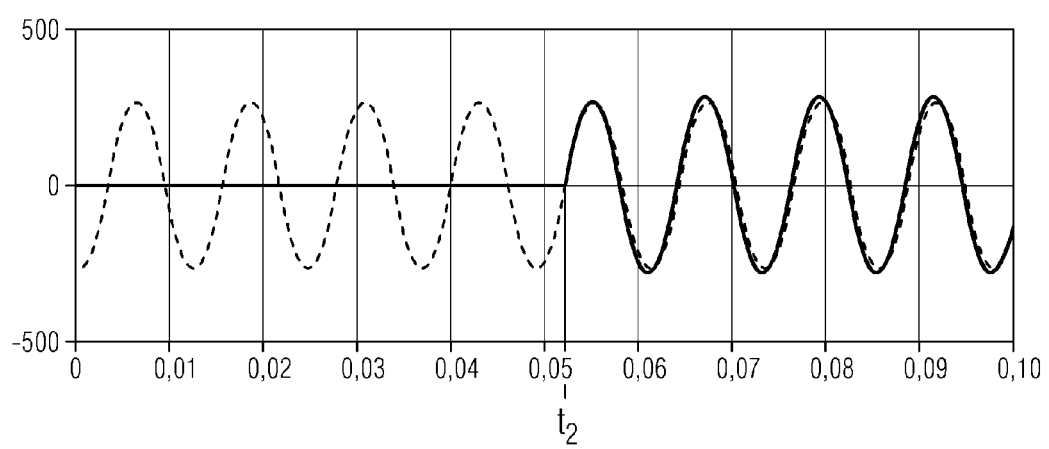
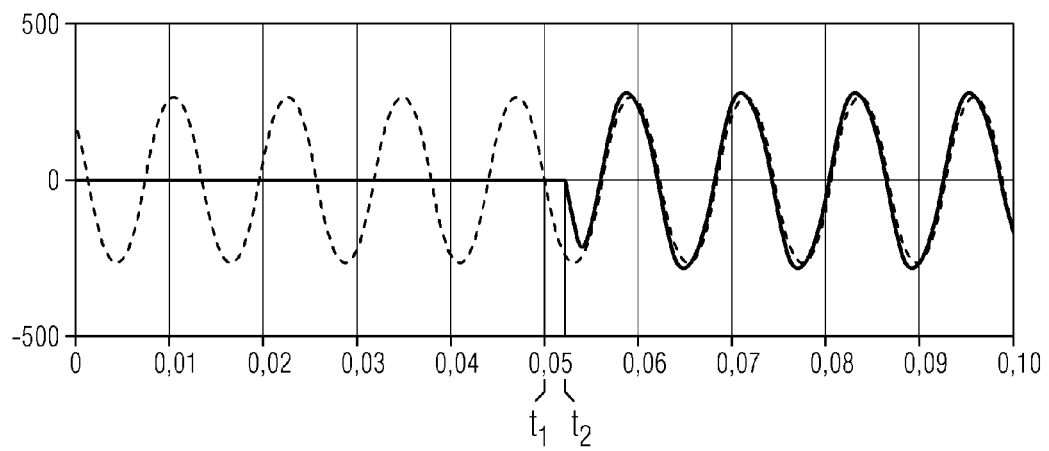

FIG 4
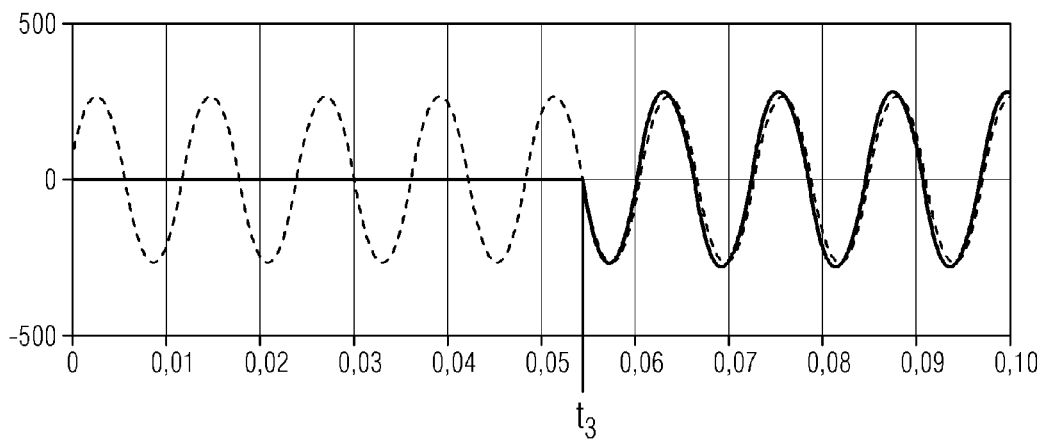
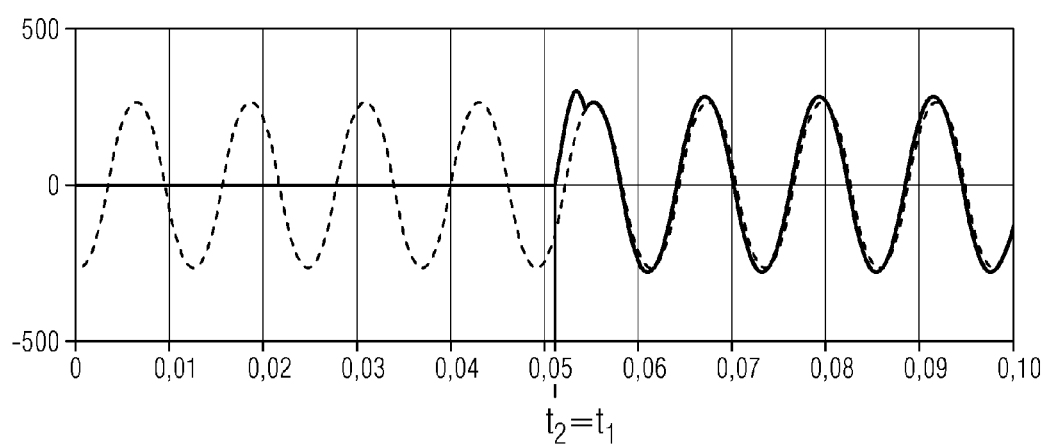
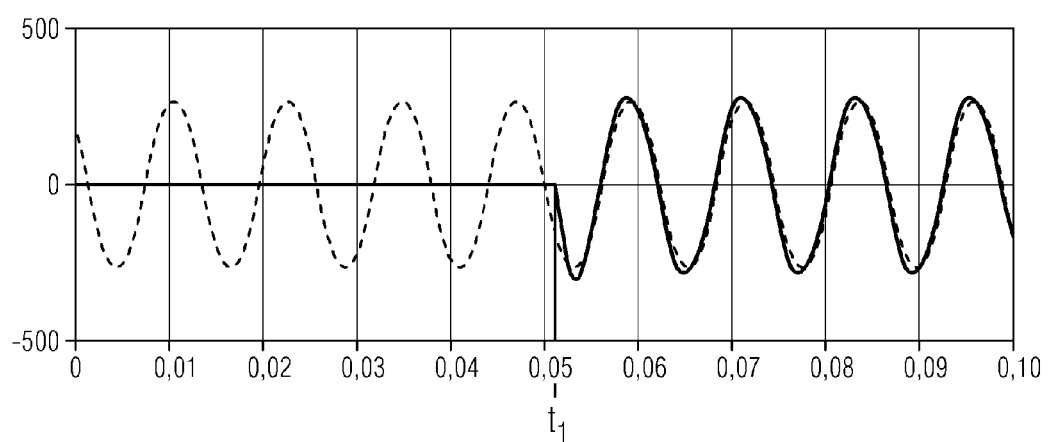

METHOD FOR ELECTRICALLY CONNECTING A CONVERTER TO AN ELECTRICAL MACHINE

BACKGROUND OF THE INVENTION

Field of the Invention

The invention relates to a method for electrically connecting a converter to an electrical machine fed by the converter, in which a disconnected electrical connection comprising a plurality of phases is closed between the converter and the machine.

In the case of high-speed trains which are driven by a permanent magnet synchronous machine, there is the problem that high voltages are induced in the synchronous machine at high travelling velocities. The induced voltages can increase to up to 2.5 times the DC-link voltage present across the converter on the input side or even higher. In unfavorable situations, this can mean that high currents are driven through the converter which damage the converter.

In order to protect the converter, it is known to arrange a disconnecting contactor between the converter and the traction motor, by means of which disconnecting contactor the traction motor can be electrically disconnected from the converter. Once the disconnecting contactor has been opened, it needs to be able to be closed again. The closing also needs to be possible during travel. For this purpose, the converter should be switched during closing in such a way that induced voltages which are still high are decayed immediately at the terminals in order to avoid excessively high currents being driven through the converter into the DC link.

BRIEF SUMMARY OF THE INVENTION

An object of the present invention consists in specifying a method for electrically connecting a converter to an electrical machine with which closing of the electrical connection in a manner which protects material can be achieved.

This object is achieved by a method of the type specified at the outset in which, in accordance with the invention, at least two phases of the connection are closed at different times.

The invention is based on the consideration that the currents begin to flow through the electrical machine again as soon as the connection is closed. The corresponding magnetic fields build up again, with the result that, at the time of closing of the connection, energy is absorbed by the electrical machine. This can mean that the electrical torque of the machine decreases significantly for a short time directly after closing, with the result that a severe mechanical jolt in the electrical machine and the movable elements connected thereto is produced. This results not only in a jolt in the travelling train but also in material fatigue of the drive train.

In order to keep such a jolt as low as possible, it is advantageous to close the connection at a time which is as favorable as possible. In order to find a favorable time, field-oriented control can be used for the converter, in which the "voltage vector" of the motor stator is evaluated and the disconnecting contactor is closed at a favorable vector position. However, there is also the problem at an optimum closing time of the disconnecting contactor in the case of a suitable rotor position that the torque at the motor jumps for a short time during closing of the contactor and thus produces a jolt. Even if this jolt is reduced by the good closing time, it is nevertheless desirable to further reduce this jolt.

The invention is based on the further consideration that, when the disconnecting contactor or connection-closing switch is closed, the actual currents of the phases of the electrical machine are zero. Even in the case of closing of the contactor in rotor-position-controlled fashion, it is therefore only possible to set a single preset current phase from the field controller to zero at the closing time. In the case of a three-phase current connection, the setpoint currents of the two other phases are unequal to zero. The phase whose setpoint current is zero at the switch-on time can slowly build up the actual current from zero. The setpoint current and the actual current coincide at the closing time of the disconnecting contactor or connection-closing switch, with the result that this phase can settle steadily. In the case of the other two phases, however, there is the situation whereby the setpoint current and the actual current collapse at the switch-on time, as a result of which an undesired torque impact is effected.

In accordance with the invention, at least two phases of the connection are closed at different times. As a result, not only can steady settling be initiated for one phase, but also very steady settling can be achieved for a second phase by virtue of the closing time of the second phases being set to a suitable time. The torque impact can be reduced and the mechanical components can be protected.

Advantageously, all of the phases of the electrical connection are switched individually, i.e. at different times. As a result, maximum flexibility in the choice of closing times can be achieved, and the torque impact can be reduced to a particular degree.

Expediently, the connection comprises three phases, as is conventional in the case of three-phase current or motive power. If two of said phases are disconnected first, a current flow through all of the phases is therefore suppressed in the case of a free, i.e. ungrounded neutral point, with the result that the electrical connection can be considered as being disconnected, although it is not completely disconnected from the converter. On the basis of Kirchhoff's law, which states that the sum of the currents through the phases is zero in the case of a free neutral point, it may be discretionary whether the first two phases to be connected are switched simultaneously or are switched at different times since the connection of a single phase does not effect any current flows. It is therefore sufficient if at least one of the phases is switched individually and at a different time from at least one other phase.

The electrical machine is advantageously a drive motor of a rail vehicle, wherein the invention is particularly suitable for use in a permanent magnet synchronous machine. However, the invention is not restricted to the use of synchronous machines. Thus, it can also be applied advantageously in other switched machines, for example switched reluctance machines. The electrical machine can also be a generator for generating electricity from mechanical energy. The power converter generates the electric currents through the phases of the connection expediently from a DC-link voltage of a rail vehicle. The DC-link voltage can be a DC DC-link voltage, which is converted by the converter into an AC voltage.

Particularly advantageously, the invention can furthermore be used during running operation of the electrical machine, in which the running machine induces a voltage through the converter into the input circuit of the converter, i.e. for example into the DC link, which voltage is at least 1.5 times the input voltage into the converter. The connection is opened according to preset criteria, for example voltage criteria, wherein the opening of the connection from the converter to the electrical machine takes place in at least two phases. In the case of the presence of predetermined conditions, for example the expiry of a preset timespan or the presence of a predetermined state in the converter and/or in the electric machine, the connection is closed again in the manner according to the invention. As a result, the operation of the electrical machine is continued.

In an advantageous embodiment of the invention, all of the phases of the electrical connection are open and all of the phases are closed individually in terms of time. As a result, freedom which is as great as possible for effective interconnection or feeding of the electrical machine with operating voltage can be achieved. In particular in the case of a neutral point which is not free of the electrical machine, current can be applied to each phase individually in time.

The torque impact can be kept particularly low if at least two phases are closed at a zero crossing of their setpoint current of these phases. The zero crossing relates to the zero crossing of the setpoint current of the electrical machine in these phases. Advantageously, these two phases are the two phases of the electrical connection which are connected last.

In order to determine the setpoint current of the individual phases of the electrical machine, it is necessary to have knowledge of the rotor position of the electrical machine. Correspondingly, a parameter indicating the rotor position of the electrical machine is measured by means of sensors and the rotor position is determined from the measurement data. The setpoint current of the individual phases can be determined from the rotor position, wherein the setpoint currents are expediently those currents through the phases in which there is no torque jump during connection of the individual phases to the converter. The zero crossings of the setpoint currents of the individual phases, i.e. those times at which the current through one phase is zero, can be determined directly from the rotor position or from the variables of the setpoint currents.

It is also advantageous to close all of the phases at a zero crossing of their setpoint current. In the case of an open neutral point, it is also possible to close the first two phases jointly, i.e. at the same time, and only to close a third phase thereafter.

In the case of a free neutral point, in accordance with Kirchhoff's law, only in the case of at least two closed phases is it possible for current to flow through these phases. It is therefore not possible for the closing moments of the two phases to be set to a zero crossing of these phases. In order to cause a torque impact which is as small as possible, it may therefore be advantageous to close the first two phases outside a zero crossing of their setpoint current and to close a third phase in particular at a zero crossing of its setpoint current. The closing moment can thus be dependent on the phase angles of the first two phases to be closed such that the torque impact is very low.

It is furthermore particularly advantageous if in the case of the two phases closed first, the sum of the two integrals over the magnitude of the differences between the setpoint current and the actual current becomes minimal. The integral or the two integrals in this case expediently need to be considered from the phase angle of the closing up to a preset phase point thereafter. The phase point is a time which is expediently between T/6 and T/3 after the closing time, where T is the duration of a full oscillation of the setpoint current, i.e. the phase time is between 60° and 120° after the closing time. The minimum in accordance with this configuration of the invention is also ensured in the case of a discrepancy of up to 20% from the calculated minimum, presupposing the same integral limits for the calculated minimum and the real integral sum. The actual current can be measured directly either at the connection or at the phases of the electrical connection or can be determined by simulation of the interaction of the converter and the electrical machine.

A further advantageous embodiment of the invention provides that the second phase to be closed is closed at that zero crossing of the phase which immediately follows a zero crossing of the phase closed first. As a result of this too, a torque impact can be kept low.

A further advantageous embodiment provides that three phases of the connection are closed at immediately successive zero crossings. This switching algorithm which is easy to control ensures a very low torque impact in the electrical machine.

The invention is also directed to a machine system comprising an electrical machine, a converter for converting an input voltage into a machine voltage having a plurality of phases and a control unit for switching the converter.

In order to achieve low-wear connection of the electrical machine, it is proposed that, in accordance with the invention, the machine system has a connection-closing switch, which has a dedicated and individually actuable connection-closing element for at least two of the phases, wherein the control unit is conditioned to individually actuate the connection-closing elements for closing the individual phase connection.

The details described above relating to the method are also applicable to the machine system, wherein the control unit is conditioned for controlling a single, a plurality of or all of the described method details. Such conditioning can be provided by means of a corresponding control program for the control unit, which, when run, effects such a control, for example in conjunction with suitable input signals such as sensor signals. For this purpose, the control unit expediently comprises electronic elements, such as a processor and a data memory, which are necessary for running the control program.

The machine system is expediently a rail vehicle or arranged in a rail vehicle. The electrical machine is advantageously a drive motor of the rail vehicle and the converter is a motor converter. The connection-closing switch is expediently a disconnecting contactor. The input voltage can be the DC-link voltage, in particular of the rail vehicle.

For precise connection of the phases, it is advantageous if the switching time of the connection-closing switch is defined precisely. Thyristors have precise switching times and are therefore particularly suitable switching elements for the connection-closing switch.

The above-described properties, features and advantages of this invention and the way in which they are achieved will become clearer and more easily understandable in connection with the description below of the exemplary embodiments, which are explained in more detail in connection with the drawings. The exemplary embodiments serve to explain the invention and do not restrict the invention to the combination of features specified therein, even not with reference to functional features. In addition, suitable features of any exemplary embodiment can also be considered explicitly in isolated form, removed from an exemplary embodiment, introduced into another exemplary embodiment in order to supplement this exemplary embodiment and/or combined with any of the claims.

BRIEF DESCRIPTION OF THE SEVERAL VIEWS OF THE DRAWING

In the drawings:

FIG. 3 shows three graphs of the three phase currents through the three phases of the electrical connection between the converter and the traction motor with the closing times of the three connection-closing elements of the disconnecting contactor illustrated, FIG. 4 shows the graph shown in FIG. 3 with different closing times.

DESCRIPTION OF THE INVENTION

Figure 1:
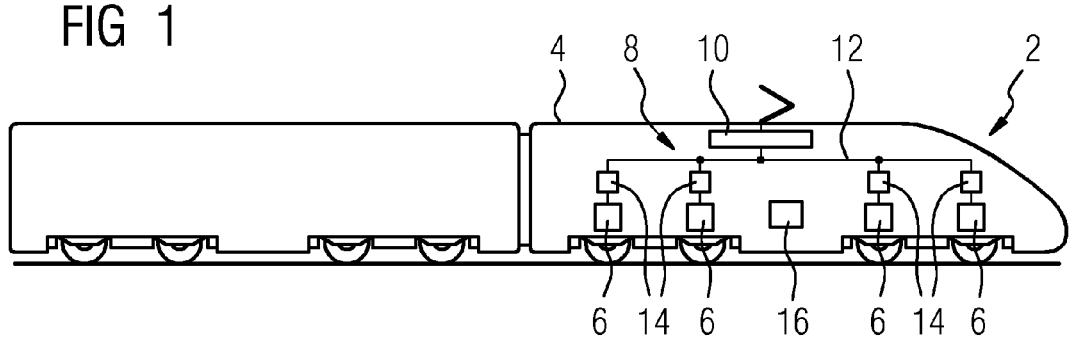
FIG. 1 shows a schematic illustration of a driven rail vehicle comprising two motor converters, which each supply two traction motors.

FIG. 1 shows a schematic illustration of a rail vehicle 2, which has a railcar 4 comprising four driven axles. Each of the axles is driven by an electrical machine 6, which electrical machines are each in the form of synchronous motors and, as traction motors, drive the train. All of the traction motors 6 are fed by a traction converter 8. The traction converter 8 comprises an input power converter 10, which generates a DC DC-link voltage in a DC link 12 from the system voltage of an overhead line, possibly via a plurality of stages.

Four converters 14, which in this exemplary embodiment are in the form of motor converters in the form of pulse-controlled inverters, whereby other forms of converters are also conceivable, however, are electrically connected to the DC link 12. The converters 14 convert the DC DC-link voltage into a three-phase AC voltage for the electrical machines 6, wherein each of the converters 14 supplies in each case one electrical machine 6. It is also possible for a converter 14 to supply two or more than two electrical machines 6. The supply of operating voltage to the electric machine 6 is controlled by a control unit 16, which controls the operation of the traction converter and the electrical machines 6. It is also possible for the control unit 16 to control further units of the rail vehicle 2, for example instruments in the driver's cab, brakes, air-conditioning units or the like.

Figure 2:
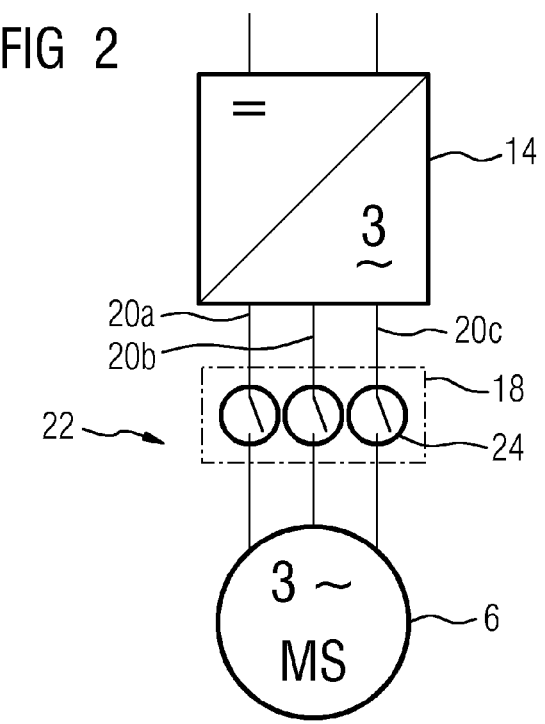
FIG. 2 shows a circuit diagram of one of the converters from FIG. 1 comprising one of the traction motors and an interposed disconnecting contactor.

A disconnecting contactor 18, which is illustrated schematically in FIG. 2, is arranged between each of the converters 14 and the electrical machines 6. As an alternative, it is possible for only a single disconnecting contactor 18 to be provided for all of the electrical machines 6 supplied by a converter 14, with the result that a disconnecting contactor 18 opens and closes a plurality of the same phases of a plurality of electrical machines 6. All three phases 20a, 20b, 20c of the electrical connection 22 between the converter 14 and the electrical machine 6 pass through the disconnecting contactor 18, which has a single disconnecting element or connection-closing element 24 for each phase 20. Each connection-closing element 24 is equipped with one or more thyristors for disconnecting and closing the corresponding phase 20 quickly and in a time-defined manner.

During operation of the rail vehicle 2, it may arise that the current flow induced by the electrical machines 6 into the DC link 12 through the converters 14 is so high that a converter 14 threatens to be damaged. The induced current, corresponding voltage variables or other measurement parameters are measured by suitable sensors and evaluated by the control unit 16, which controls opening of the connection-closing switch 18 in the case of the presence of critical parameters. The connection-closing switch 18 opens in at least two, in particular all three phases or with all of its connection-closing elements 24, and the electrical connection between the converter 14 and the electrical machine 6 is disconnected or open.

In order to resume the driving of the rail vehicle 2, the electrical connection 22 is closed again by the control unit 16 according to preset criteria. The control unit 16 actuates the converter 14 for the supply to the electrical machines 6 by means of field-oriented control. By virtue of the control method of field-oriented control, the setpoint currents through the individual phases 20, or parameters from which the setpoint currents can be derived, are known to the control unit 16. The control unit 16 determines the zero crossings of the setpoint currents of the individual phases 20 from the profile of the setpoint currents.

FIG. 3 shows the setpoint currents in amperes plotted against the time in seconds. The profiles of the setpoint currents are illustrated by dashed lines in FIG. 3. The uppermost of the three graphs shows the setpoint current through the phase 20a, the central graph shows the setpoint current through the phase 20b, and the graph at the bottom shows the setpoint current through the phase 20c. At time t=0, the setpoint currents of all three phases 20 are zero, the electrical connection 22 is completely disconnected, and all of the connection-closing elements 24 are open.

If there is no longer a risk of current-induced damage to the converter 14 because the voltage induced in the motor 6 no longer substantially exceeds the input voltage of the converter 14, for example, the control unit 16 controls closing of the electrical connection 22 by the connection-closing switch 18. The closing of the electrical connection takes place in a first exemplary embodiment shown in FIG. 3 at zero crossings of the setpoint current of the individual phases 20. At time $t_1$, the setpoint current of the third phase 20c passes through a downward zero crossing, with the result that the current through the third phase 20c at time $t_1$ is zero. At this time, the closing of the third connection-closing element 24 is controlled by the control unit 15. However, by virtue of this closing of the phase 20c, there is still no current flowing through this phase 20c since the other two phases 20a, 20b are still disconnected and the neutral point of the electrical machine 6 is open, i.e. is not grounded. According to Kirchhoff's rule whereby the sum of the phase currents is zero, the current first begins to flow with the closing of the second phase.

At time $t_2$, the second phase 20b, which is illustrated in the central graph in FIG. 3, passes through an upward zero crossing. At this time, the closing of the second connection-closing element 24 is controlled by the control unit 16 with the result that this phase 20b is also closed or connected. After time $t_2$, actual current flows through the second and third phases 20b, 20c, as can be seen from the two graphs at the bottom in FIG. 3 from the continuous current lines. In this case, the actual current of the second phase 20b follows the setpoint current very well and the actual current of the third phase 20c lags the setpoint current with the opposite mathematical sign with respect to phase 20b, with the result that the sum of the currents is zero.

The first phase 20a is still open up to time $t_3$, at which this phase 20a also passes through a zero crossing and the corresponding connection-closing element 24 is closed.

After this time, the currents are distributed through all three phases 20, wherein the actual current of the first phase 20*a* also very precisely follows the setpoint current.

At the closing times of the connection-closing elements 24 or the connection 22, which are controlled with respect to the zero crossings, the sum of the differences between the setpoint currents and the actual currents is very low. The first two phases 20*a*, 20*b* follow the setpoint current very well. Only in the third phase does the actual current deviate markedly from the setpoint current, brought about by the sum of currents rule. This deviation is responsible for a remaining torque jump in the electrical torque of the electrical machine 6, but this is overall considerably lower than in the case of simultaneous connection of all three phases 20 by a disconnecting contactor with coupled connection-closing elements. The mechanical loading on the components of the electrical machine 6 and the drive train of the railcar 4 or rail vehicle 2 is considerably less.

All three phases 20 of the connection 22 are in this exemplary embodiment closed at immediately successive zero crossings. Since the closing time of the first phase 20*c* to be closed is less important owing to the lack of current flowing, it is sufficient, however, if the second and third phases 20*b*, 20*a* to be closed are closed at immediately following zero crossings. It is advantageous in this case if the phases 20 are closed in the order in which they have their immediately successive zero crossings. In the exemplary embodiment shown in FIG. 3, therefore, the third phase 20*c* is closed first, then the second phase 20*b* and the first phase 20*a* first since the zero crossings of the phases 20, starting from a first phase 20*c* to be closed, follow one another in this order. The zero crossings at which the phases 20 are then actually closed is not so important, i.e. later zero crossings can also be selected. A slightly larger torque jump occurs, however, if that phase whose zero crossing immediately follows the zero crossing of the phase 20*c* closed first is closed last.

A further exemplary embodiment having different closing times is illustrated in FIG. 4. In contrast to the exemplary embodiment shown in FIG. 3, the closing time of the second phase 20*b* is selected such that the current through the first two closed phases 20*b*, 20*c* takes place shortly prior to (in the case of phase 20*b*) or shortly after phase 20*c* in the corresponding zero crossing. As a result, the difference between the setpoint current and the actual current in the first closed phase 20*c* can be reduced. However, the difference in the phase 20*b* which is closed second is increased. The closing time $t_3$ of the phase 20*a* to be closed third remains unchanged.

In the exemplary embodiment shown in FIG. 4, therefore, the closing times of the two phases 20*b*, 20*c* closed first are the same, i.e. $t_2=t_1$. Since the closing time of the first phase 20*c* to be closed is in principle irrelevant, the closing time $t_1$ can also be selected to be earlier. The exemplary embodiment selected in FIG. 4 makes it possible, however, for a connection-closing switch 18 or a disconnecting contactor, which has only two connection-closing elements, to be used, wherein one of the connection-closing elements opens and closes two phases simultaneously. The sums of the differences between the setpoint current and the actual current of all of the phases in the exemplary embodiment shown in FIG. 4 is greater than the corresponding difference from the exemplary embodiment shown in FIG. 3. Correspondingly, the jump in the torque of the electrical machine 6 is greater in the exemplary embodiment shown in FIG. 4. However, in particular at high velocities, it is still less than in the case of three phases 20 connected simultaneously.

Figure 5:
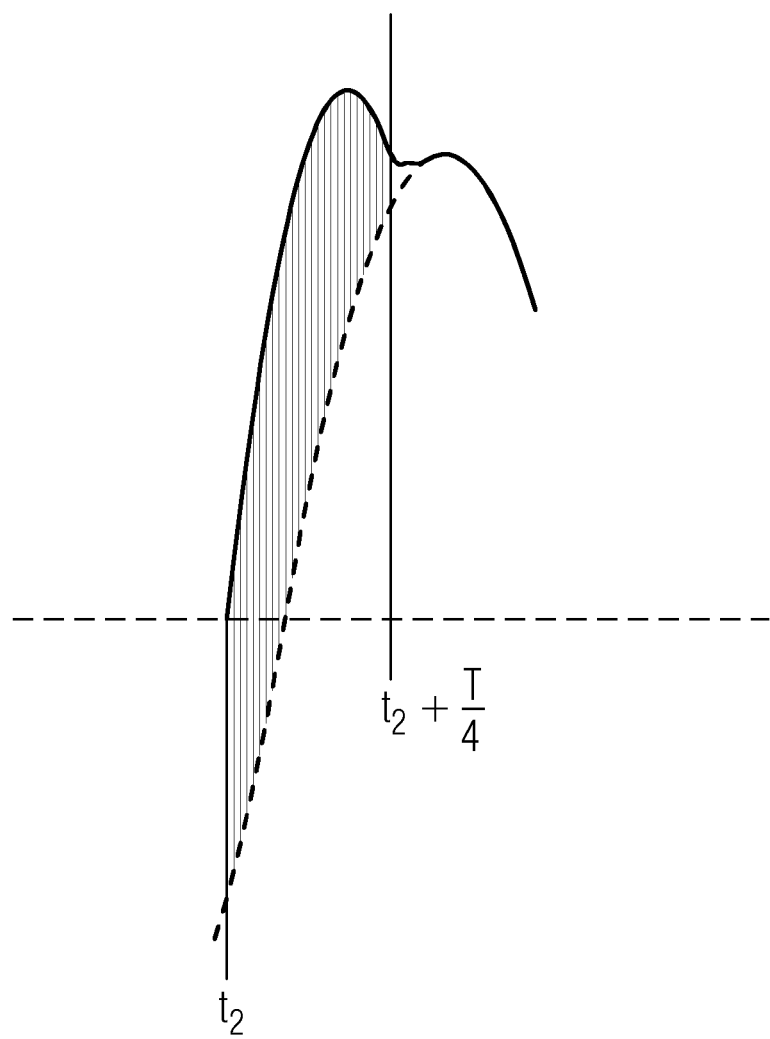
FIG. 5 shows an enlarged detail of the graph in the center in FIG. 4 with an illustrated integral area between the setpoint current and the actual current.

A measure of the difference between the setpoint current and the actual current is illustrated schematically in FIG. 5. FIG. 5 shows a detail from the central phase 20*b* of the exemplary embodiment shown in FIG. 4. As a measure for the difference between the setpoint current and the actual current, the integral between the two currents is illustrated as a hatched area; the integral is selected from closing time $t_2$ to T/4, i.e. 90°, after the closing time $t_2$. Correspondingly, the difference between the setpoint current and the actual current would also need to be integrated in the case of the first connected phase 20*c* between the closing time of the second phase to be connected $t_2$ and 90° after this closing time. In each case the magnitude of the difference needs to be integrated.

The sum of the integrals is a measure of the discrepancy between the electrical torque of the electrical machine 6 and the torque during continuous, settled operation of the electrical machine 6. Correspondingly, it is advantageous for the sum of the two integrals over the magnitude of the differences between the setpoint current and the actual current to become as small as possible. At least the sum should be less than it would be in the case of joint closing of all three phases 20. It is particularly advantageous to select the closing times in such a way that the sum becomes minimal.

The invention claimed is:

1. A method for electrically connecting a converter to an electrical machine to be supplied by the converter, the method which comprises:
    providing each one of a plurality of phases with a connection-closing element for electrically connecting the respective one of the plurality of phases between the converter and the electrical machine;
    starting from a disconnected state of the electrical connection; and
    closing the connection-closing element of each one of at least two of the plurality of phases at mutually different times;
    wherein in the closing step, the connection-closing element of each one of the at least two phases is closed at a zero crossing of a setpoint current of the electrical machine in the respective one of the at least two phases.

2. The method according to claim 1, wherein, in the disconnected state, the connection-closing elements of all of the plurality of phases are open and the closing step comprises closing the connection-closing element of all of the plurality of phases individually with a temporal offset.

3. The method according to claim 1, which comprises closing the connection-closing element of three phases of the plurality of phases at immediately successive zero crossings.

4. A method for electrically connecting a converter to an electrical machine to be supplied by the converter, the method which comprises:
    providing each one of a plurality of phases with a connection-closing element for electrically connecting the respective one of the plurality of phases between the converter and the electrical machine;
    starting from a disconnected state of the electrical connection;
    closing the connection-closing element of each one of at least two of the plurality of phases at mutually different times; and
    closing the connection-closing element of a first phase and the connection-closing element of a second phase at the same time and then closing the connection-closing element of a third phase thereafter.

5. The method according to claim 4, which comprises closing the connection-closing elements of the first and second phases outside a zero crossing of a setpoint current thereof and closing the connection-closing element of the third phase at a zero crossing of the setpoint current thereof.

6. The method according to claim 4, wherein, in the case where the connection-closing elements of the first and second phases are closed first, a sum of two integrals over a magnitude of differences between the setpoint current and the actual current becomes minimal.

7. The method according to claim 4, which comprises, closing the connection-closing element of the second phase at a zero crossing immediately after a zero-crossing in a phase closed first.

8. A machine system, comprising:
an electrical machine;
a converter for converting an input voltage into a machine voltage having a plurality of phases;
a connection-closing switch having a dedicated and individually actuable connection-closing element for at least two of the plurality of phases; and
a control unit for switching said converter, said control unit being configured to individually actuate said connection-closing elements for closing the individual phases;
said control unit configured for closing the connection-closing element of each one of the at least two of the plurality of phases at a zero crossing of a setpoint current of the electrical machine in the respective one of the at least two phases.

9. The machine system according to claim 8, wherein each of said connection-closing elements includes a thyristor.

10. A machine system, comprising:
an electrical machine;
a converter for converting an input voltage into a machine voltage having a plurality of phases;
a connection-closing switch having a dedicated and individually actuable connection-closing element for a plurality of phases; and
a control unit for switching said converter, said control unit being configured to individually actuate said connection-closing elements for closing the individual phases;
said control unit configured for closing the connection-closing element of a first phase and the connection-closing element of a second phase at the same time and then closing the connection-closing element of a third phase thereafter.

* * * * *